United States Patent

[11] 3,550,746

| [72] | Inventors | Knud Dinesen Juul;<br>Jens Engholm Mikkelsen, Ale, Denmark |
|---|---|---|
| [21] | Appl. No. | 842,831 |
| [22] | Filed | July 11, 1969 |
| [45] | Patented | Dec. 29, 1970 |
| [32] | Priority | June 17, 1966 |
| [33] | | Denmark |
| [31] | | No. 3144/66 |
| | | Continuation of application Ser. No. 647,037, June 19, 1967, now abandoned. This application July 11, 1969, Ser. No. 842,831 |

[54] LOADING APPARATUS FOR BALES
3 Claims, 15 Drawing Figs.

[52] U.S. Cl. ............................................. 198/8, 198/128, 214/42
[51] Int. Cl. ............................................. B65b 65/02
[50] Field of Search ............................................. 198/7BL, 8, 11, 35, 128, 160, 197, 198, 127, 7, 2.4, 42

[56] References Cited
UNITED STATES PATENTS

| 1,853,253 | 4/1932 | Bennett | 198/160X |
| 2,490,381 | 12/1949 | Shields | 198/11 |
| 2,556,920 | 6/1951 | Hills | 198/198 |
| 3,127,973 | 4/1964 | Scott | 198/7(BL) |
| 3,127,977 | 4/1964 | Hollyday | 198/128 |
| 2,305,044 | 12/1942 | Toews | 198/198 |
| 2,556,920 | 6/1951 | Hills | 198/198 |
| 3,127,973 | 4/1964 | Scott | 198/7(BL) |
| 3,127,977 | 4/1964 | Hollyday | 198/128 |
| 1,853,253 | 4/1932 | Bennett | 198/160X |
| 2,490,381 | 12/1949 | Shields | 198/11X |
| 2,542,446 | 2/1951 | Abel et al. | 198/11 |
| 2,682,945 | 7/1954 | Harrer et al. | 198/11 |
| 3,191,755 | 6/1965 | Timberlake | 198/128 |

*Primary Examiner*—Andres H. Nielsen
*Attorney*—Nolte & Nolte

ABSTRACT: A movable apparatus having a first adjustable conveyor system for picking up bales from the earth's surface and lifting the bales at a relatively low speed to a second conveyor system which is driven at an adjustable high speed. The second conveyor system accelerates the bales and throws them obliquely upwards into a wagon.

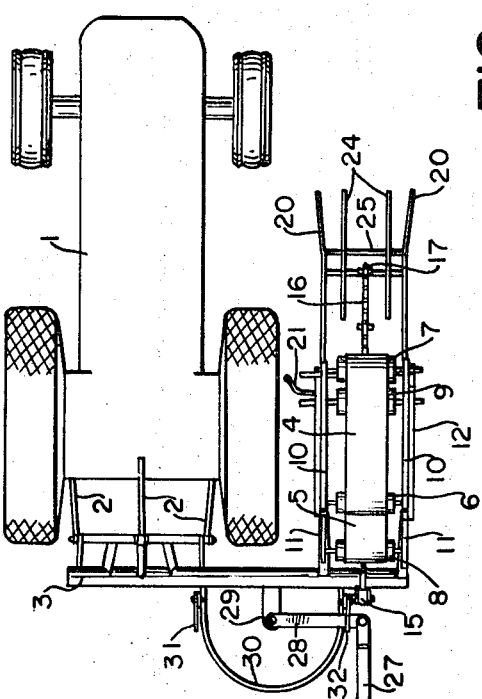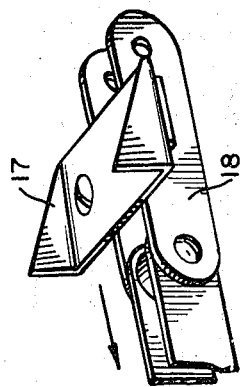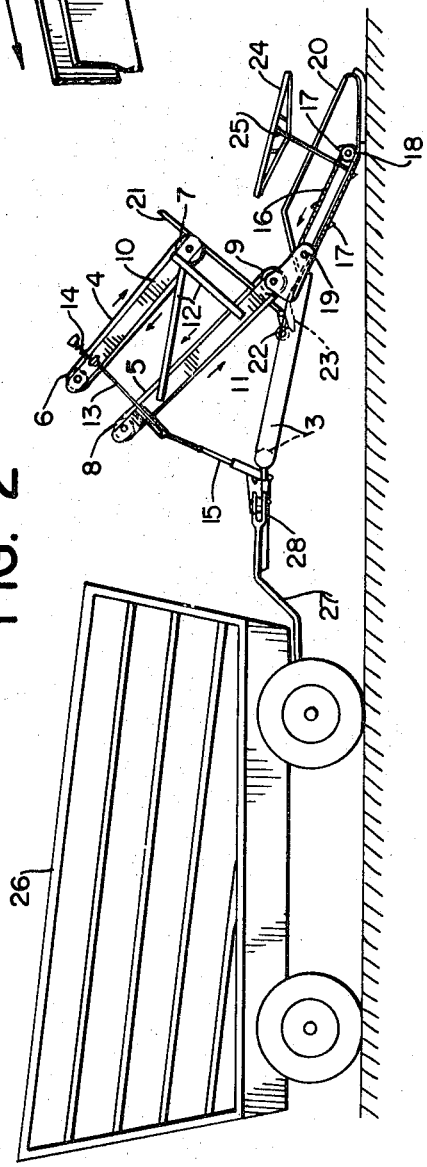

PATENTED DEC 29 1970 3,550,746

INVENTORS
KNUD DINESEN JUUL
JENS ENGHOLM MIKKELSEN

BY *Nolte & Nolte*
ATTORNEYS

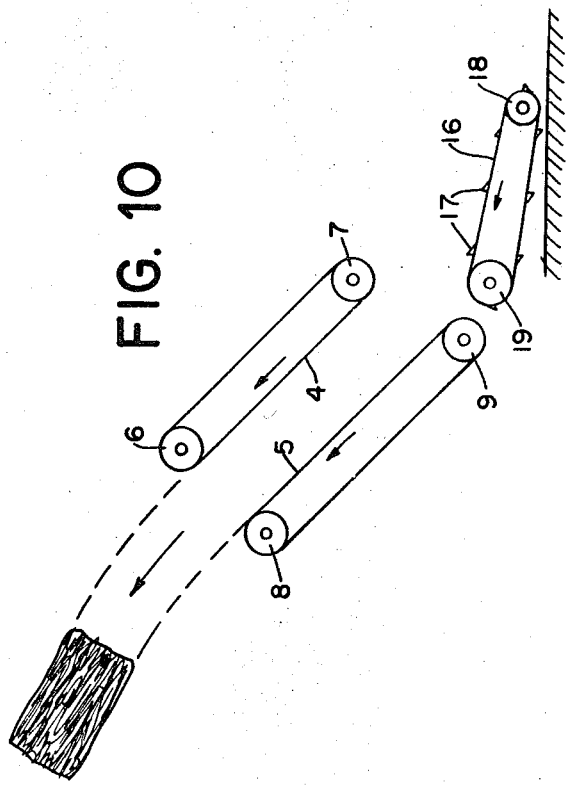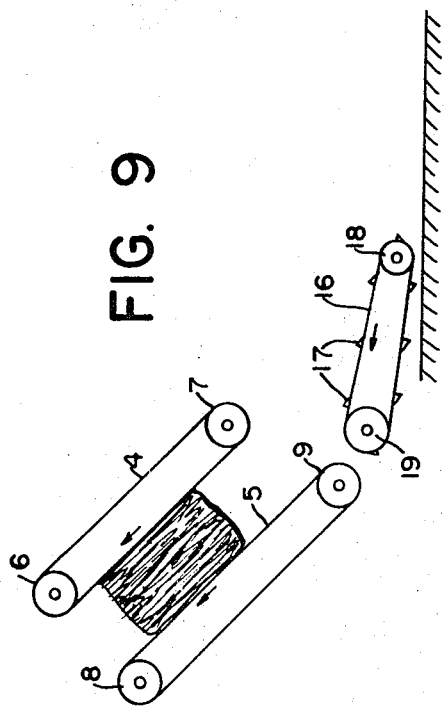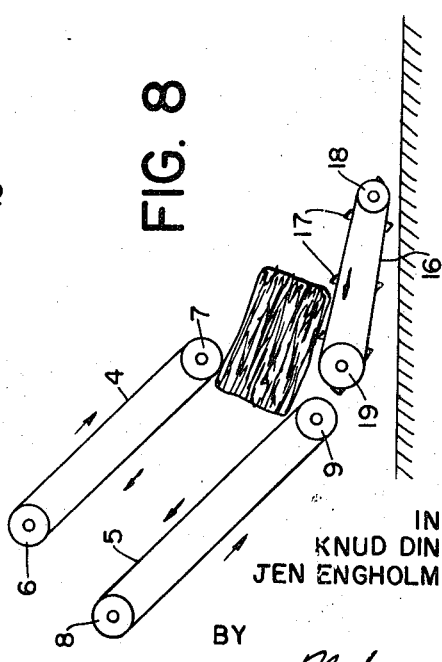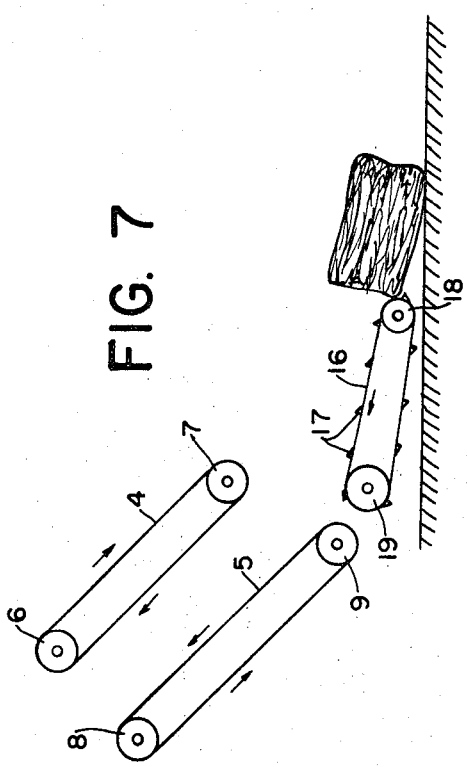

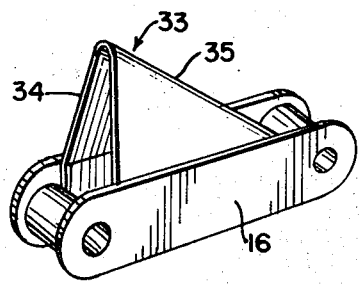
FIG. 11
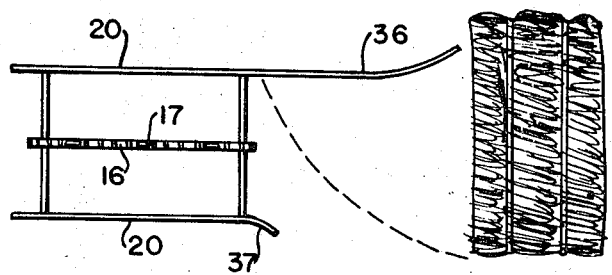
FIG. 12
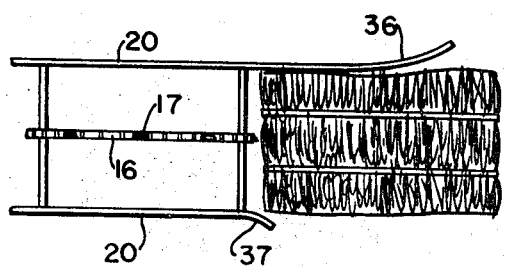
FIG. 13
FIG. 14
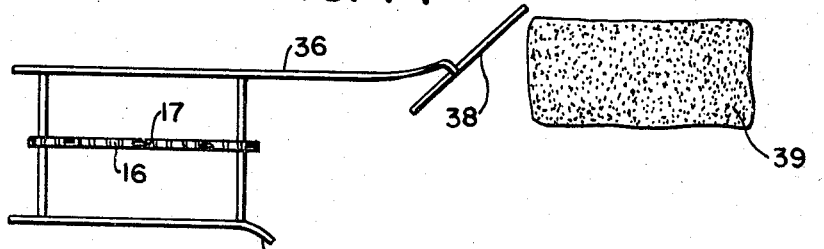
FIG. 15
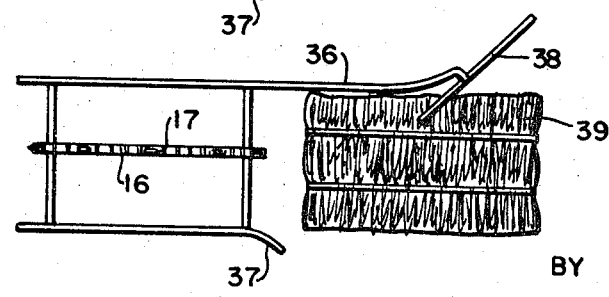
INVENTORS
KNUD DINESEN JUUL
BY Nolte & Nolte
ATTORNEYS

LOADING APPARATUS FOR BALES

This is a continuation of application No. 647,037 filed Jun. 19, 1967 now abandoned.

The invention relates to a loading apparatus for bales comprising a picking-up means for picking up bales lying on the field and conveyor means for conveying the picked-up bales into a wagon that is driven forward along with the loading apparatus, for instance by means of a tractor.

Apparatuses of the mentioned type are known, which have an oblique or vertical chain conveyor that can pick up bales from the field and convey these up to a platform lying spaced upwardly from the bottom of the wagon, wherefrom said bales then must be taken manually and stacked in the wagon. Therefore, such apparatuses need two operators, i.e. an operator to drive the traction vehicle and an operator to stack the bales.

The object of the invention is to provide for an apparatus of the mentioned type that can be operated by one operator. This is obtained, according to the invention, thereby that the conveyor means consists of a bale-throwing mechanism of the type that has two endless, obliquely placed conveyor bands with two substantially parallel stretches facing each other and moving upwards with so great a velocity that the bales at the upper end of said stretches can be thrown obliquely upwards, said velocity being adjustable, and that the picking-up means is formed like a band conveyor with an oblique upper side, said upper side's rear end being situated near the lower end of said stretches of the conveyor bands, and said upper side's front end being situated near the surface of the earth, whereby the band conveyor has backwardly directed driver means. The operator of the tractor can pick up the bales by directing the loading apparatus against them, whereby they are gripped by the picking-up means that conveys them to the conveyor bands which throw them backwards into the wagon. By varying the velocity of the conveyor bands the operator can vary the length of the throws and in this way distribute the bales in the wagon. Therefore, the operator of the traction vehicle can provide for the picking-up of the bales and for the loading of the wagon.

According to the invention the conveyor bands may be adjustable to different angle of inclination. Hereby it is rendered possible to use the loading apparatus not only to pick up the bales from the field, but also as a stationary loading apparatus that can be adapted to many different uses, as it can be used for long, flat throws, for instance within low buildings, as well as for high, steep throws, for instance when stacking high stacks. In such a loading apparatus according to the invention, where the one conveyor band is placed above the other, the upper band may, according to the invention, be shorter than the lower one, the upper band's lower roller being displaced backwardly in relation to the lower band's lower roller. Hereby it is obtained that the lower roller of the upper band does not obstruct the passage into the space between the bands, when these are adjusted to very high throws. The driver means may, according to the invention, be formed as sawtooth formed protrusions with an oblique edge facing in a direction backwards in relation to the direction of movement of the band. Hereby it is obtained, that they let go of the bales easily, when these are gripped by the throwing-bands.

According to the invention there may be placed, over the band conveyor of the picking-up means, a guiding device for the bales, said guiding device being capable of being changed-over between two positions, where in the one position it has a guiding member that is parallel with the band conveyor, so that it can hold bales that are conveyed from the surface of the earth up to the band conveyor in engagement with the latter, whilst in the other position it has a guiding member that leads obliquely down to the front portion of the band conveyor, so that it can lead bales coming from above above down to the band conveyor.

In the following the invention will be described in relation to the accompanying drawings, where:

FIG. 1 shows a loading apparatus hitched on along the side a traction vehicle;

FIG. 2 shows a side view of the loading apparatus shown in FIG. 1;

FIG. 3 shows a detail of the loading apparatus shown in the FIGS. 1 and 2 showing the sawtooth formed driver means on the pickup conveyor in a greater scale;

FIGS. 7—10 show schematic views of four different positions of a bale, in relation to the loading apparatus, from the picking-up from the surface of the earth till the throwing out from said loading apparatus;

FIG. 11 shows a portion of the pickup conveyor with a driver member of another embodiment;

FIG. 12 shows the front portion of a loading apparatus with another embodiment for the bale-guiding means and with a bale situated in front of the guiding means;

FIG. 13 shows the same as in FIG. 12 with the bale situated in another position;

FIG. 14 shows the front portion of a loading apparatus with a third embodiment for the bale-guiding means and with a bale situated in front of the guiding means; and FIG. 15 shows the same as in FIG. 14 with the bale situated in another position.

Figure 4:
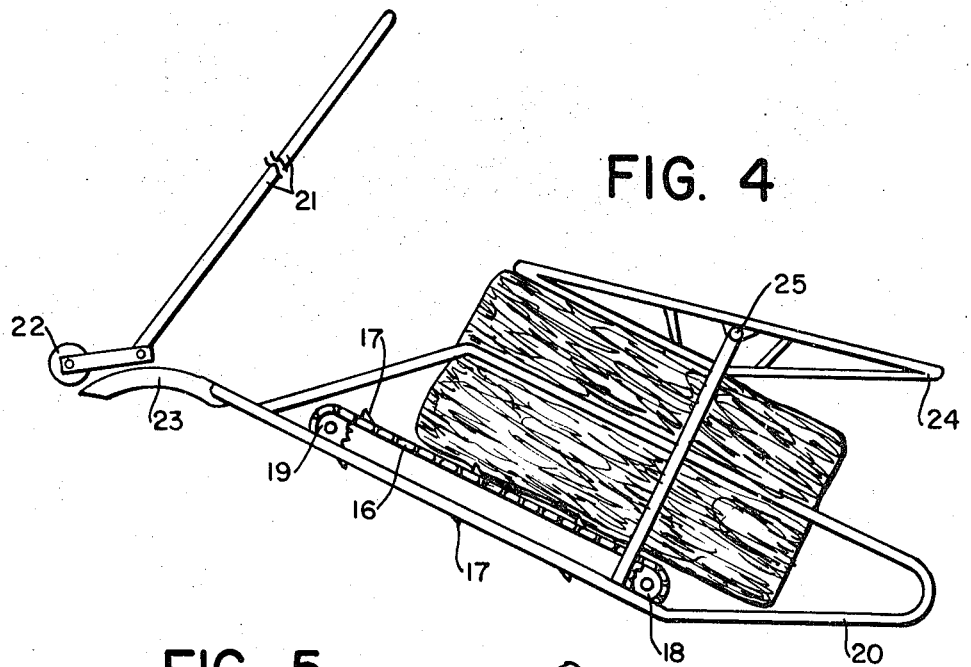
FIG. 4 shows in greater scale a part of the loading apparatus shown in FIG. 2 showing the pickup conveyor in the position for picking up bales from the surface of the earth.

In FIGS. 1 and 2 the numeral 1 denotes a traction vehicle, having a three-point attaching mechanism 2 to which is secured a main frame 3 of the loading apparatus. The numerals 4 and 5 denote two endless bands for the throwing of the bales. Each of the bands is placed under tension over two horizontally journaled rollers, respectively 6 and 7, for the upper band and 8 and 9 for the lower band. The one roller of each of the two pairs is connected, over a not shown clutch, with the power takeoff of the traction vehicle in such a way, that the bands' two sides, which face each other, move obliquely upwards with great velocity during the operation of the loading apparatus. The two pairs of rollers are mounted on two frames, respectively 10 and 11, that at the lower end are connected by means of braces 12, whereas at the upper end they are held resiliently against each other by means of a pull rod 13 having a compression spring 14. The lower frame 11 is swingably secured, above the roller 9, to the main frame 3 of the loading apparatus. The angle of inclination of the frame may be adjusted by means of a telescope pipe 15 that at one end, is connected with the main frame 3 of the apparatus and at the other end is connected with the front portion of the frame 11. by In front of the throwing bands, in continuation of the lower of said throwing bands, there is placed a picking-up assembly having a band conveyor in the form of a chain conveyor 16 that has sawtooth formed driver means 17. The chain conveyor's chains are placed on two chain wheels 18 and 19, whereof the one is driven over a not shown clutch by the power takeoff off of the traction vehicle. The chain wheels are mounted on a frame 20 that above the rear chain wheel 19 is swingably suspended in the main frame 3 of the machine. The frame 20 may, by means of a tipping rod 21 having a guiding roller 22, which presses against a guiding rail 23 on the frame, be moved up or down between a conveying position, where the frame is horizontal, and an operation position, where the lower end of the frame slides on the surface of the earth. The frame 20 serves also as side guidance for the bales that are driven along by the chains 16. For further guidance of the bales the picking-up assembly has a guiding device 24 that is swingably suspended around a shaft 25. Hereby, the guiding device 24 can be adjusted to two positions, where in the one position, the position shown in FIG. 4, it can guide the bales lying on the surface of the earth against the chain conveyor 16 and hold them abutting said chain conveyor, whilst in the other position, the position shown in FIG. 5, it can lead bales coming from above down towards the chain conveyor 16.

Figure 6:
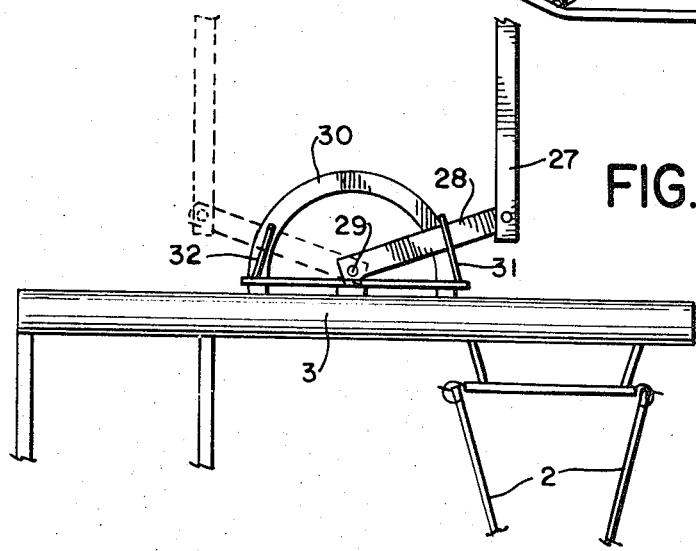
FIG. 6 shows another part of the loading apparatus shown in FIG. 1 showing in greater scale the hitching mechanism for the wagon employed to receive the bales from the loading apparatus.

A transport wagon 26 is connected to the rear portion of the main frame 3, the wagon's pole 27 being connected to an arm 28 that is swingably secured to the frame 3. The arm 28 is, as shown in FIG. 6, pivotably placed on a vertical shaft 29, and may be swung over a guiding bow 30 back and forth between two extreme positions that are shown by respectively dotted and full lines in FIG. 6. The arm can be securely held in the two positions by means of two pawls 31 and 32 that by means of a not shown cord drive can be lifted and hereby release the arm. In the one of the two positions the transport wagon is in the operation position behind the loading apparatus and in the other it is in the transporting position behind the traction vehicle.

Figure 5:
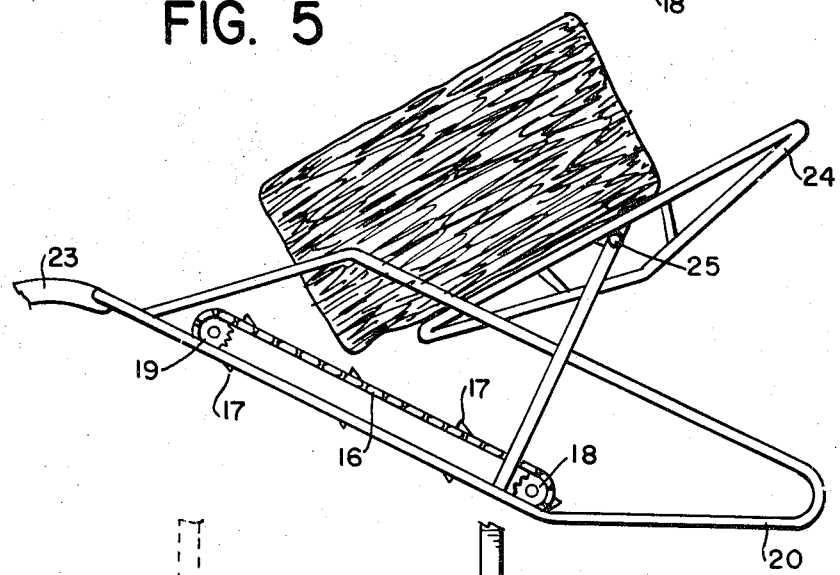
FIG. 5 shows the pickup conveyor in the position for driving forward bales coming from above.

The described apparatus may be used as a loading apparatus in the field for high-pressure pressed hay or straw bales, or as a stationary throwing machine for use in stacking these bales in stacks, for instance in barns. In FIGS. 7—10 the principle for the use of the apparatus as a loading apparatus in the field is shown. The picking-up assembly is driven forward over the field with the front end of the chain conveyor just above the surface of the earth. When the chain conveyor arrives at a bale, the bale is carried upwardly, up to the upper side of the chain conveyor, where the guide shown in FIG. 4 keeps it pressed against the latter, which carries the bale in between the throwing bands, as shown in FIG. 2. Here the bale is gripped securely between the bands, as shown in FIG. 9, and is thrown out at the top, as shown in FIG. 10. Since the bale does not slide on any fixed supporting means, but is carried by the bands, there is no friction, and there can be obtained a considerable acceleration of the bale. The distance between the bands narrows slightly in the direction of throwing, and hereby is obtained a good grip on the bale just before it is thrown. The throwing length may, with an apparatus according to the construction shown, be varied continuously from 3 to 20 meters by varying the revolutions per minute of the tractor and thereby the velocity of the bands. Hereby, it is rendered possible for the operator without any help to distribute the bales over the platform of the following transport wagon. If the apparatus is to be used as a stationary throwing machine the guiding device 24 is changed-over, as shown in FIG. 5, whereby it will function as an input-table. The throwing angle may be altered by varying the height of the throwing bands by means of the adjustable telescope pipe 15, so that, in this way, there may be obtained, for instance, long flat throws within low buildings, or high, steep throws, for instance, when stacking high stacks. To prevent the upper throwing band from obstructing the input of the bales between the throwing bands at a steep position of these for high throws, the front end of the upper band is made approximately 20 cm. shorter than the corresponding end of the lower band.

It is the object of the invention to provide a loading apparatus that may be operated by one operator. Therefore, it is desirable that he, without getting down from the traction vehicle, is able during the driving, to alter the position of the transport wagon from the working position behind the loading apparatus to the transport position behind the traction vehicle. This is obtained, according to the invention, by means of the arm 28, that is situated at the back of the loading apparatus and placed pivotably at the one end on the shaft 29, said arm's other end being arranged for connection with the wagon pole 27 of the wagon 26 for receiving the bales thrown from the loading apparatus, the arm being swingable in a horizontal plane between two extreme positions along the rear side of the transversely placed main frame 3 of the loading apparatus, whereby the arm 28 can be securely held in the two extreme positions by means of two pawl mechanisms 31 and 32, and hereby the wagon 26 is securely held in the working position behind the loading apparatus or in the transport position behind the traction vehicle. If the operator wishes to change the position of the transport wagon he brakes the traction vehicle a little. Hereby, the transport wagon moves forward towards the main frame 3, the pull in the pole 27 and thus in the arm 28 in the pawl 31 or 32 ceases, and the pawl may be easily lifted by operation of the herewith connected cord drive. Once more the traction vehicle moves forward and the arm 28 swings out in continuation of the wagon pole 27 perpendicularly to the frame 3. By carrying out a little turn of the traction vehicle, the arm 28 is turned further towards the other side, and by once more braking the traction vehicle a little the wagon pole 27 will press the arm 28 towards the pawl situated here, said pawl locking securely said arm in the other extreme position. It will be seen that it hereby is rendered possible for the operator to carry out changing-over operations by means of a few comparatively simple manouvers without having to leave his place on the traction vehicle.

In FIG. 11 there is shown a driver means 33 that has turned out to be especially advantageous. Said driver means consists of a piece of iron sheet plate that is bent into U-form, and the edges are welded to the links of the chain 16 as shown. The front edge 34, in relation to the direction of movement of the chain, of the driver means is nearly perpendicular to the longitudinal direction of the chain, whilst the upper edge 35, which is formed by the back side of the U-profile, is inclined backwardly and downwardly towards the chain 16.

In FIG. 12 there is shown a special embodiment of the front end of the loading apparatus, where one of the guiding means 20 is continued as a guiding member 36, the front end of which is bent outwards to the side, whilst the other of the guiding means 20 is replaced by a somewhat shorter guiding member 37, the front edge of which is bent outwards to the side. The front end of the guiding device 24 is situated approximately midway between the front end of the member 36 and the front end of the member 37. This special embodiment is advantageous for turning a bale lying transversely to the right position, as shown in FIGS. 12 and 13.

In FIG. 14 there is schematically shown an embodiment, where at the front end of the guiding member 36 there is place an oblique guiding member 38, that is situated at such a height that a bale lying on its flat side may pass in under said guiding member, whilst a bale lying on one of its other sides, and therefore projecting higher up, may be turned over by the member 38, so that it thereby is brought to lie on its flat side. In FIG. 14 there is shown a bale 39 lying on one of its narrow sides, and in FIG. 15 the bale has been turned over, so that it lies on its flat side for the input into the loading apparatus.

The member 38 in FIG. 14 is meant to be secured to the guiding member 36, but it can instead of this be placed on the tractor near the front wheel.

We claim:

1. In a loading apparatus for bales, a combination of picking-up means for picking up bales lying on the field, and conveyor means for conveying the picked-up bales up into a wagon that is driven forward along with the loading apparatus by means of a driving vehicle, said conveyor means comprising a balethrowing mechanism of the type that has two endless, obliquely placed conveyor bands having two essentially parallel stretches facing each other to receive said bales and moving upwardly with so great a velocity that the bales at the upper end of said stretches may be thrown obliquely upwards, said velocity being adjustable independently of that of said picking-up means, the picking-up means comprising a band conveyor which is operatively disposed between the lower end of said conveyor means and the earth's surface and provided with a plurality of projecting elements for engaging said bales, said projecting elements being inclined in the direction of said stretches to allow smooth taking-over of said bales by said conveyor means, said band conveyor of the picking-up means further comprising a guiding device for the bales, said guiding device having a guiding member which is mounted above said band conveyor and adapted for being alternatively placed into two guiding positions, in one of said position the guiding member being directed in parallel with said band conveyor, so that it can hold bales picked up from the surface of the earth and in the other position being directed obliquely down to the front portion of said band conveyor, so that it can lead bales coming from above down to the band conveyor.

2. In a loading apparatus according to claim 1, said guiding device further comprising two lateral guiding members for orienting said bales, one of said lateral guiding members being longer than the other one and provided at its upper end with a horizontally oriented bale upsetting member, said horizontal upsetting member being directed towards the entrance of said band conveyor and situated at such a height as to pass through the lying bales and turn over the standing ones.

3. In a loading apparatus for bales, a combination of picking-up means for picking up bales lying on the field, and conveyor means for conveying the picked-up bales up into a wagon that is driven forward along with the loading apparatus by means of a driving vehicle, said conveyor means comprising a bale-throwing mechanism of the type that has two endless, obliquely placed conveyor bands having two essentially parallel stretches facing each other to receive said bales and moving upwardly with so great a velocity that the bales at the upper end of said stretches may be thrown obliquely upwards, said velocity being adjustable, said conveyor bands being adjustable to different angles of inclination, one band being placed above the other band, the upper bend being shorter than the lower one, and the upper ends of the two conveyor bands being in alignment one to another, said picking-up means comprising a band conveyor which is operatively disposed between the lower end of said conveyor means and the earth's surface and provided with a plurality of projecting elements for engaging said bales, said projecting elements being inclined in the direction of said stretches to allow smooth taking-over of said bales by said conveyor means.